United States Patent
Aoki (10) Patent No.: US 9,643,597 B2
(45) Date of Patent: May 9, 2017

(54) CONTROL APPARATUS FOR HYBRID VEHICLE

(71) Applicant: TOYOTA JIDOSHA KABUSHIKI KAISHA, Toyota-shi, Aichi-ken (JP)

(72) Inventor: Takanori Aoki, Nissin (JP)

(73) Assignee: TOYOTA JIDOSHA KABUSHIKI KAISHA, Toyota-Shi (JP)

( * ) Notice: Subject to any disclaimer, the term of this patent is extended or adjusted under 35 U.S.C. 154(b) by 0 days.

(21) Appl. No.: 15/140,951

(22) Filed: Apr. 28, 2016

(65) Prior Publication Data

US 2016/0318508 A1   Nov. 3, 2016

(30) Foreign Application Priority Data

Apr. 30, 2015  (JP) ................. 2015-092586

(51) Int. Cl.
*B60W 20/40* (2016.01)
*B60K 6/365* (2007.10)
(Continued)

(52) U.S. Cl.
CPC ............. *B60W 20/40* (2013.01); *B60K 6/24* (2013.01); *B60K 6/26* (2013.01); *B60K 6/365* (2013.01);
(Continued)

(58) Field of Classification Search
CPC ...... B60W 20/04; B60W 20/00; B60W 20/10; B60W 10/06; B60W 10/08; B60W 10/26; B60W 10/30; B60W 2510/0676; B60W 2510/242; B60W 2510/30; B60W 2510/305; B60W 2540/10; B60W 2540/12; B60W 2710/0677; B60W 2710/086;
(Continued)

(56) References Cited

U.S. PATENT DOCUMENTS 5,823,282 A    10/1998  Yamaguchi
2009/0240387 A1   9/2009  Kawai et al.
(Continued)

FOREIGN PATENT DOCUMENTS

EP    2025904 A1    2/2009
JP    H0956009 A    2/1997
(Continued)

*Primary Examiner* — Mcdieunel Marc
*Assistant Examiner* — James E Stroud
(74) *Attorney, Agent, or Firm* — Andrews Kurth Kenyon LLP (57) ABSTRACT

A power that is required to start an engine, a required power of a driver of a hybrid vehicle, a power that is consumed by auxiliaries and a power that is outputtable from an electrical storage device are obtained. A first correction value is obtained such that the first correction value becomes a smaller value as the obtained outputtable power increases, the first correction value becomes a larger value as the outputtable power reduces and the first correction value is a positive value or a negative value. A first threshold for an engine startup is obtained by subtracting the power that is required to start the engine and the power that is consumed by the auxiliaries and the first correction value from the power that is outputtable from the electrical storage device such that the first threshold becomes a larger value as the outputtable power increases.

2 Claims, 6 Drawing Sheets

(51) Int. Cl.
| | |
|---|---|
| *B60K 6/445* | (2007.10) |
| *B60K 6/48* | (2007.10) |
| *B60K 25/00* | (2006.01) |
| *B60W 10/06* | (2006.01) |
| *B60W 10/08* | (2006.01) |
| *B60W 10/26* | (2006.01) |
| *B60W 10/30* | (2006.01) |
| *B60W 20/00* | (2016.01) |
| *F02N 11/00* | (2006.01) |
| *B60K 6/24* | (2007.10) |
| *B60K 6/26* | (2007.10) |
| *B60K 6/383* | (2007.10) |
| *B60W 20/10* | (2016.01) |

(52) U.S. Cl.
CPC .............. *B60K 6/383* (2013.01); *B60K 6/445* (2013.01); *B60K 6/48* (2013.01); *B60K 25/00* (2013.01); *B60W 10/06* (2013.01); *B60W 10/08* (2013.01); *B60W 10/26* (2013.01); *B60W 10/30* (2013.01); *B60W 20/00* (2013.01); *B60W 20/10* (2013.01); *F02N 11/00* (2013.01); *B60K 2006/268* (2013.01); *B60W 2510/0676* (2013.01); *B60W 2510/242* (2013.01); *B60W 2510/30* (2013.01); *B60W 2510/305* (2013.01); *B60W 2540/10* (2013.01); *B60W 2540/12* (2013.01); *B60W 2710/0677* (2013.01); *B60W 2710/086* (2013.01); *B60Y 2200/92* (2013.01); *Y10S 903/905* (2013.01); *Y10S 903/906* (2013.01); *Y10S 903/911* (2013.01); *Y10S 903/913* (2013.01); *Y10S 903/93* (2013.01)

(58) Field of Classification Search
CPC . B60K 6/24; B60K 6/26; B60K 6/365; B60K 6/383; B60K 6/445; B60K 6/48; B60K 25/00; B60K 2006/268; F02N 11/00; B60Y 2200/92; Y10S 903/905; Y10S 903/906; Y10S 903/911; Y10S 903/913; Y10S 903/93
USPC .......................................................... 701/22
See application file for complete search history.

(56) References Cited

U.S. PATENT DOCUMENTS

| | | | |
|---|---|---|---|
| 2010/0071975 | A1 | 3/2010 | Aoki |
| 2013/0131902 | A1 | 5/2013 | Yamagata |
| 2014/0000245 | A1 | 1/2014 | Harada et al. |
| 2015/0283993 | A1* | 10/2015 | Takano .................... B60K 6/48 701/22 |
| 2015/0314777 | A1* | 11/2015 | Koike .................... B60K 6/442 701/22 |
| 2016/0107625 | A1* | 4/2016 | Shand .................... B60T 8/3255 701/22 |
| 2016/0193938 | A1* | 7/2016 | Hata ...................... B60K 6/387 701/22 |
| 2016/0214601 | A1* | 7/2016 | Ito ............................ B60K 6/48 |

FOREIGN PATENT DOCUMENTS

| | | |
|---|---|---|
| JP | 2010070118 A | 4/2010 |
| JP | 2011-073564 A | 4/2011 |
| JP | 5001476 B2 | 8/2012 |
| JP | 2013-086704 A | 5/2013 |
| KR | 1020090016034 A | 2/2009 |
| WO | 2012053601 A | 4/2012 |

* cited by examiner

CONTROL APPARATUS FOR HYBRID VEHICLE

INCORPORATION BY REFERENCE

The disclosure of Japanese Patent Application No. 2015-092586 filed on Apr. 30, 2015 including the specification, drawings and abstract is incorporated herein by reference in its entirety.

BACKGROUND OF THE INVENTION

1. Field of the Invention

Embodiments of the present invention relate to a control apparatus intended for a hybrid vehicle including an engine and a motor and, more particularly, to a control apparatus that executes control for starting the engine at a time when the hybrid vehicle is traveling by using only the power of the motor.

2. Description of Related Art

Japanese Patent Application Publication No. 2011-73564 (JP 2011-73564 A) describes an apparatus that starts an engine in so-called EV mode (electric traveling mode) in which a hybrid vehicle is traveling by using only the driving force of a motor. A hybrid vehicle is described as an example. In the hybrid vehicle, an engine and a first motor are coupled to a power split mechanism formed of a differential mechanism, driving force output from the engine is output from the power split mechanism to an output member, and the first motor is caused to function as a generator by driving the first motor with the use of the engine. In the hybrid vehicle, a second motor is coupled to the output member, the second motor is driven as a motor by using electric power generated by the first motor.

In the hybrid vehicle described in JP 2011-73564 A, when the second motor is caused to function as a motor by using the electric power of an electrical storage device in a state where the operation of the engine is stopped, the hybrid vehicle is set to a mode in which the hybrid vehicle travels by using electric power (EV mode) or functions an electric vehicle. As for a driving force that is obtained in a state where only the motor is used as a driving force source, an outputtable driving force becomes insufficient for a required driving force where a driver performs acceleration operation. In such a case, the engine is started by rotating the first motor, coupled to the engine via the power split mechanism, in a positive direction (a rotation direction of the engine during steady operation). That is, when the first motor rotates in the positive direction to output torque, positive torque acts on the rotating element, to which the engine is coupled, in the power split mechanism, so it is possible to raise the rotation speed of the engine. In such a case, negative torque (torque in a direction to stop rotation) acts on the rotating element to which the output member is coupled. Therefore, the driving torque of the hybrid vehicle is reduced by the use of the output torque of the first motor at a startup of the engine. Therefore, in the thus configured hybrid vehicle, when the engine is started at the time when the hybrid vehicle is traveling in EV mode, the output torque of the second motor is increased for the purpose of suppressing a decrease in driving force.

In the apparatus described in JP 2011-73564 A, a torque value obtained by subtracting a reaction torque resulting from a startup of the engine and a margin, which increases with an increase in the output limitation of the battery and reduces with an increase in the vehicle speed, from a rated torque of the motor that is used for traveling is set as a threshold, and the engine is started when the required torque exceeds the threshold.

Japanese Patent Application Publication No. 2013-86704 (JP 2013-86704 A) describes an apparatus configured to cause a vehicle to travel in EV mode by causing the above-described second motor to function as a motor by using the electric power of an electrical storage device, and if a required power exceeds a threshold, an engine is started. The threshold in the apparatus described in JP 2013-86704 A is set to a power obtained by subtracting a power, which is required to start the engine, and a predetermined margin from an output upper limit value limited in the electrical storage device.

SUMMARY

In the apparatus described in JP 2011-73564 A, the margin that is subtracted from the output upper limit value (output limitation) that is limited in the battery is increased as the output upper limit value increases, so the threshold reduces in a state where the output upper limit value is relatively large and the output of the battery is sufficient. Therefore, the engine is started in a state where a required torque is relatively small, electric power cannot be effectively used because of a reduction in a region in which the EV mode is performed (a frequency or opportunity that the EV mode is performed), and, by extension, improvement in fuel economy of the hybrid vehicle may be limited.

With the apparatus described in JP 2013-86704 A, the engine is started in a state where there is an allowance for electric power, so it is possible to suppress a situation, such as deterioration of a shock due to a startup of the engine. However, the hybrid vehicle is able to travel in EV mode because there is an allowance in electric power; nevertheless, the engine is started. Therefore, there is a possibility that the region (frequency or opportunity) of the EV mode reduces and, as a result, it is not possible to efficiently and effectively utilize electric power. For the purpose of eliminating such an inconvenience, when the allowance is reduced with respect to the output upper limit value at a startup of the engine, the region (frequency or opportunity) of the EV mode is increased, while, on the other hand, electric power becomes insufficient at any one of a low vehicle speed and a high vehicle speed, driving torque changes as a result of a startup of the engine, and this may cause a shock or a so-called feeling of slowness may arise.

Embodiments of the invention provide a control apparatus that is intended for a hybrid vehicle including an engine and a first motor, which are coupled to each other via a power split mechanism, and a second motor coupled to an output element of the power split mechanism. The control apparatus effectively utilizes electric power by increasing a frequency or opportunity for the hybrid vehicle to travel by using the power of the two motors, which is able to suppress a feeling of strangeness, such as a shock resulting from a startup of the engine when the engine is started in a state where the hybrid vehicle is traveling by using the power of the two motors.

One embodiment of the invention provides a control apparatus for a hybrid vehicle. The hybrid vehicle includes an engine and a first motor, which are coupled to each other via a power split mechanism, a second motor coupled to an output element of the power split mechanism, an electrical storage device to which the first motor and the second motor are connected, an engagement mechanism that prevents reverse rotation of the engine, and auxiliaries. The hybrid vehicle is able to travel in electric traveling mode by using driving force that is output from the first motor and the second motor in a state where reverse rotation of the engine is prevented by the engagement mechanism. The control apparatus executes control for starting the engine in a state where the hybrid vehicle is traveling in the electric traveling mode. The control apparatus includes a controller that controls the engine. The controller is configured to obtain a power that is required to start the engine, a required power based on acceleration and deceleration operation performed by a driver of the hybrid vehicle, a power that is consumed by the auxiliaries, and a power that is outputtable from the electrical storage device. The controller is configured to obtain a first correction value such that the first correction value becomes a smaller value as the obtained outputtable power increases, the first correction value becomes a larger value as the outputtable power reduces and the first correction value is a positive value or a negative value, obtain a first threshold by subtracting the power that is required to start the engine, the power that is consumed by the auxiliaries and the first correction value from the power that is outputtable from the electrical storage device such that the first threshold becomes a larger value as the outputtable power increases, and, when the required power exceeds the first threshold while the hybrid vehicle is traveling in the electric traveling mode, start the engine. A second embodiment of the invention may also provide a control apparatus for a hybrid vehicle. The hybrid vehicle includes a power split mechanism, an engine, a first motor coupled to the engine via the power split mechanism, a second motor coupled to an output element of the power split mechanism, an electrical storage device connected to the first motor and the second motor, an engagement mechanism configured to prevent reverse rotation of the engine, and auxiliaries. The hybrid vehicle is configured to travel in electric traveling mode by using driving force that is output from the first motor and the second motor in a state where reverse rotation of the engine is prevented by the engagement mechanism. The control apparatus includes a controller configured to i) start the engine in a state where the hybrid vehicle is traveling in the electric traveling mode, ii) obtain a first power, a second power, a third power and a fourth power, the first power being a power that is required to start the engine, the second power being a required power based on acceleration and deceleration operation performed by a driver of the hybrid vehicle, the third power being a power that is consumed by the auxiliaries, and the fourth power being a power that is outputtable from the electrical storage device, iii) obtain a first correction value such that the first correction value becomes a smaller value as the fourth power increases, the first correction value becomes a larger value as the fourth power reduces and the first correction value is a positive value or a negative value, iv) obtain a first threshold by subtracting the first power, the third power and the first correction value from the fourth power such that the first threshold becomes a larger value as the fourth power increases, and v) when the second power exceeds the first threshold while the hybrid vehicle is traveling in the electric traveling mode, start the engine.

In an embodiment of the invention, the controller may be further configured to vi) obtain a second correction value such that the second correction value becomes a larger value as a temperature of the engine decreases, vii) obtain a second threshold by reducing the first threshold in response to the second correction value, and viii) when the engine is started for the first time after switching into a state where electric power is allowed to be supplied from the electrical storage device to the first motor and the second motor, start the engine when the required power exceeds the second threshold.

According to embodiments of the invention, when the required power based on a driver's acceleration and deceleration operation exceeds the first threshold while the hybrid vehicle is traveling in the electric traveling mode by using driving force that is output from the first motor and the second motor, the engine that has been stopped while the hybrid vehicle is traveling in the electric traveling mode is started. The first threshold is a value obtained by subtracting the power that is consumed by the auxiliaries and the first correction value from the power that is outputtable from the electrical storage device. The first correction value becomes a smaller value (a smaller positive value or a larger negative value) as the outputtable power increases and becomes a larger value (a larger positive value or a smaller negative value) as the outputtable power reduces.

Therefore, the first threshold becomes a larger value when the power that is outputtable from the electrical storage device is large than when the outputtable power is small, so, when the outputtable power is large, the engine is not started and the electric traveling mode is kept until the required power increases. As a result, a region in which a driving state to perform the electric traveling mode or a frequency or opportunity to perform the electric traveling mode increases, so it is possible to effectively utilize electric power. When the power that is outputtable from the electrical storage device reduces, the threshold becomes a smaller value, so the engine is started in a state where the required power is small. Therefore, the engine is started in a state where there is an allowance in power for driving the first motor and the second motor, so it is possible to avoid or suppress a situation, such as insufficient driving force and occurrence of a shock.

When the engine is started for the first time after switching into a state where electric power is allowed to be supplied from the electrical storage device to the first motor and the second motor, that is, after the hybrid vehicle is switched into a so-called ready-on state, and when the temperature of the engine is low, the engine is started on the condition that the required power exceeds the second threshold. The second threshold is a threshold obtained by subtracting the second correction value from the first threshold. The second correction value is set to a larger value as the temperature of the engine decreases. Therefore, as the temperature of the engine decreases, the second threshold becomes a smaller value. As a result, even when the region to perform the electric traveling mode is expanded to a higher power side by setting the first threshold for determining a startup of the engine in response to the power that is outputtable from the electrical storage device as described above, but when the temperature of the engine is low, the threshold for starting the engine reduces in response to the engine temperature, so it is possible to avoid or suppress a delay of a startup of the engine, insufficient driving force and a shock.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Figure 6:
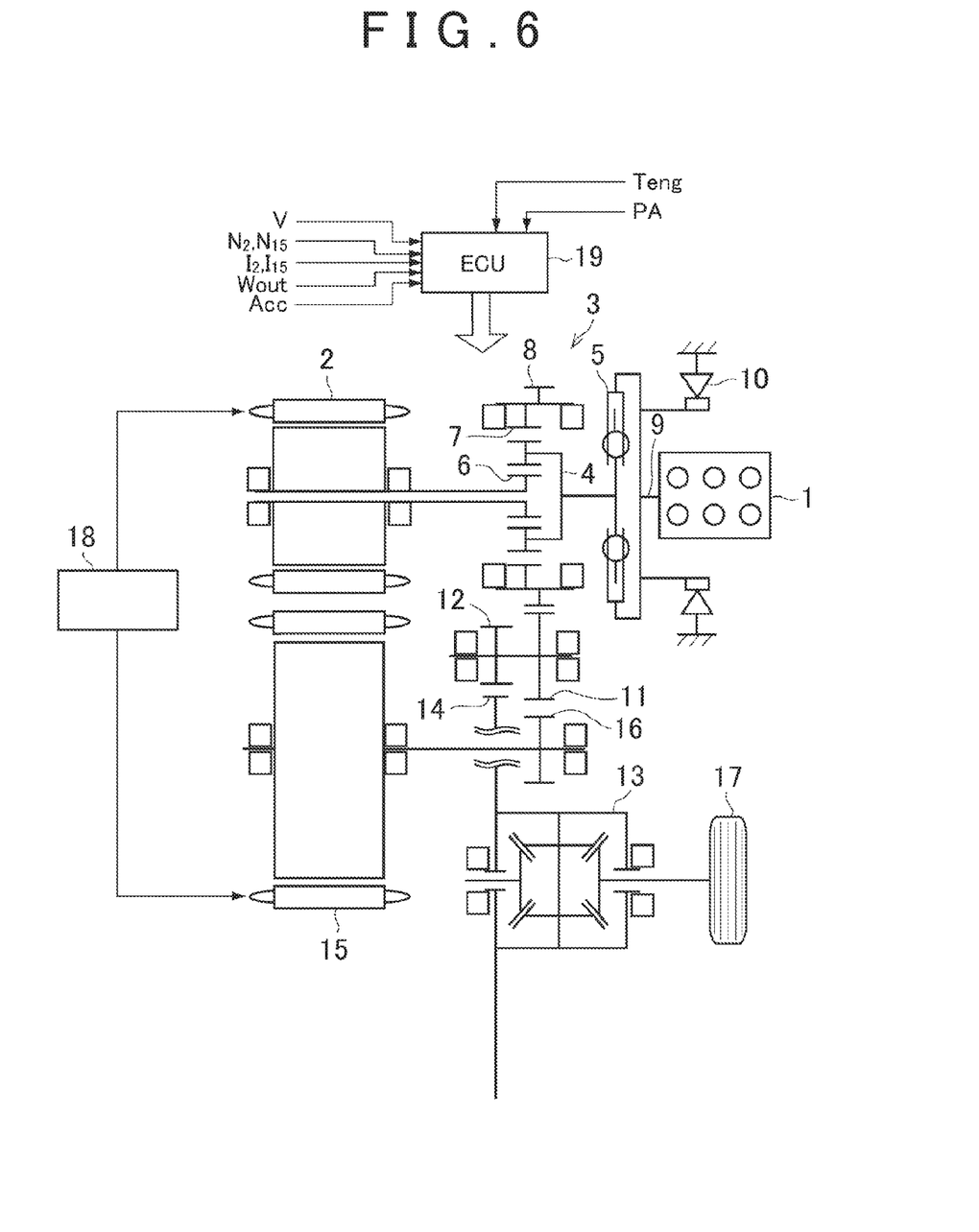
FIG. 6 is a skeletal view that shows an example of a powertrain in an intended hybrid vehicle in an embodiment of the invention.

An intended hybrid vehicle in an embodiment of the invention includes an engine and a motor as driving force sources, and is a hybrid vehicle that is able to travel by using only the driving force of the motor. FIG. 6 schematically shows an example of a powertrain of a hybrid vehicle. In FIG. 6, an engine (ENG) 1 and a first motor (MG1) 2 are coupled to a power split mechanism 3. The power split mechanism 3 is a mechanism that performs differential action by the use of three rotating elements. A planetary gear train is employed as the power split mechanism in the example shown in FIG. 6. The engine 1 is coupled to a first rotating element (for example, a carrier 4) via a spring damper mechanism 5 for reducing torsional vibrations. The first motor (first motor generator: MG1) 2 is coupled to a second rotating element (for example, a sun gear 6). A third rotating element (for example, a ring gear 7) serves as an output member, and an output gear 8 is integrated with the third rotating element.

The engine 1 is a multi-cylinder reciprocating engine. A one-way clutch 10 that prevents reverse rotation of an output shaft (crankshaft) 9 of the engine 1 is provided. The one-way clutch 10 is to apply reaction torque to the carrier 4 by stopping reverse rotation of the engine 1 at a time when the first motor generator 2 outputs torque for propelling the hybrid vehicle (torque in a negative rotation direction).

The spring damper mechanism 5 is a damper mechanism having a known configuration that a drive-side member to which the torque of the engine 1 is transmitted and a driven-side member coupled to the carrier 4 are coupled to each other by a coil spring arranged so as to be oriented in a rotation direction. The first motor generator 2 is a motor having a power generation function. Part of the power of the engine 1 is transmitted to the first motor generator 2 via the power split mechanism 3, and the first motor generator 2, where necessary, controls an engine rotation speed by transmitting negative torque (torque in the direction to stop rotation) resulting from power generation to the sun gear 6.

A counter driven gear 11 is coupled to an output gear 8. A counter drive gear 12 provided coaxially with a counter driven gear 11 is in mesh with a ring gear 14 in a differential gear 13. A drive gear 16 mounted on a rotor shaft of a second motor (second motor generator: MG2) 15 is in mesh with the counter driven gear 11. That is, the torque of the second motor generator 15 is subtracted from or added to torque that is transmitted from the output gear 8 to drive wheels 17. The second motor generator 15, as well as the above-described first motor generator 2, is a motor having a power generation function, and is able to output any one of positive and negative torques.

Each of the motor generators 2, 15 is connected to a power supply unit 18 including inverters and an electrical storage device. An electronic control unit (ECU) 19 is provided. The ECU 19 controls a startup or stop of the engine 1 or the torque of the engine 1 and controls the torque, for example, of each of the motor generators 2, 15. The ECU 19 is mainly formed of a microcomputer. The ECU 19 is configured to execute computation using input data or stored data and output a computed result to the engine 1 or the power supply unit 18, for example, as a control command signal. Examples of input data that are used in the control include a vehicle speed V, rotation speeds N2, N15 of the motors 2, 15, current values (or torques) I2, I15 of the motors 2, 15, a power (electric power) Wout that is outputtable from the electrical storage device, an opening degree Acc of an accelerator pedal (not shown) that is operated by a driver for acceleration or deceleration, a temperature (engine coolant temperature) Teng of the engine 1, and a power PA that is consumed by auxiliaries. A map for obtaining a required driving force (or required power PD) on the basis of an accelerator operation amount, a map in which various correction values (margins) that are used to set thresholds for engine startup determination, and a power PE that is required to start the engine 1, are stored in advance.

Figure 7:
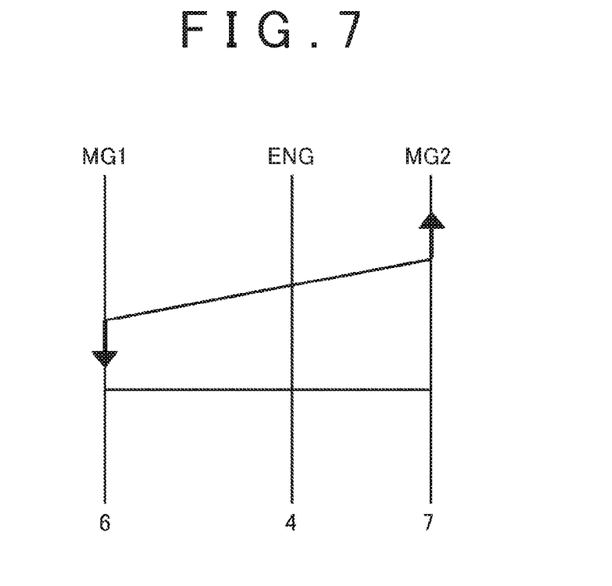
FIG. 7 is a nomograph that shows an operation state in HV mode in a planetary gear train that constitutes a power split mechanism.

The hybrid vehicle is able to select any one of a mode (HV mode) in which the hybrid vehicle travels by using power that is output from the engine 1 and a mode (EV mode) in which the hybrid vehicle travels by driving the motors by using the electric power of the power supply unit 18. Each of the modes will be simply described. FIG. 7 is a nomograph that shows the operation state of the power split mechanism 3 in HV mode. Torque in the positive rotation direction is transmitted to the carrier 4 by the engine 1. In contrast, negative torque (torque in the direction to reduce the rotation speed) acts on the sun gear 6 because of the fact that the first motor generator 2 functions as a generator and negative torque resulting from traveling resistance acts on the ring gear 7. That is, power output from the engine 1 is distributed by the power split mechanism 3 to the first motor generator 2 and the output gear 8. The rotation speed of the engine 1 is controlled by the first motor generator 2 to a rotation speed at which fuel economy is good. On the other hand, electric power generated by the first motor generator 2 is supplied to the second motor generator 15, the second motor generator 15 functions as a motor, and converts the power, converted to electric power by the first motor generator 2, to mechanical power again. That is, torque output from the second motor generator 15 is added to torque output from the output gear 8.

Figure 8:
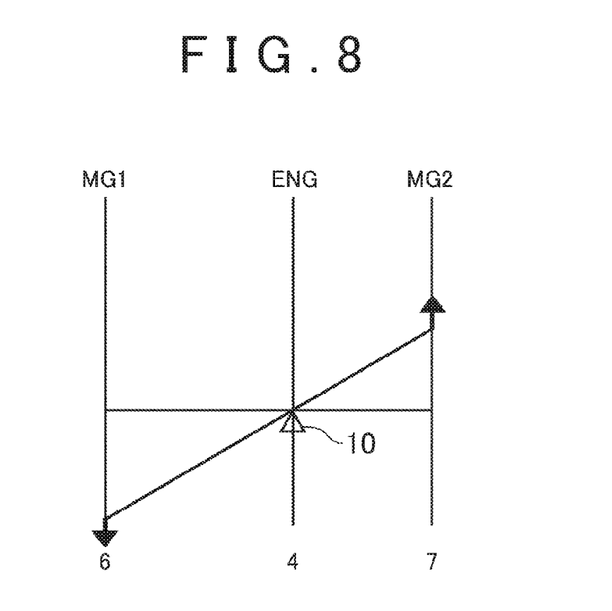
FIG. 8 is a nomograph that shows an operation state in EV mode in a planetary gear train that constitutes a power split mechanism.

The EV mode is a traveling mode in which the first motor generator 2 and the second motor generator 15 are used as driving force sources. Each of the motor generators 2, 15 is driven as a motor by using electric power output from the electrical storage device of the power supply unit 18, and the hybrid vehicle travels by using the output torque. FIG. 8 is a nomograph that shows an operation state of the power split mechanism 3 in EV mode. Each of the first motor generator 2 and the second motor generator 15 functions as a motor, the first motor generator 2 outputs positive torque (torque for increasing the rotation speed) in the negative rotation direction, and the second motor generator 15 outputs positive torque in the positive rotation direction. Rotation in the negative rotation direction (which is different from the direction in which the engine 1 rotates in a steady state) of each of the engine 1 and the carrier 4 coupled to the engine 1 is prevented by the one-way clutch 10. Therefore, torque in the positive rotation direction is added to the ring gear 7 by the torque of the first motor generator 2. In this way, the hybrid vehicle travels forward by using the driving force of these two motor generators 2, 15. During braking, the second motor generator 15 generates electric power, negative torque (torque in the direction to stop rotation) acts as braking torque, and the generated electric power is charged into the electrical storage device. In EV mode, only the second motor generator 15 may be used as a driving force source. In this way, the state where the hybrid vehicle travels by using only the driving force of the motor generators 2, 15 is an electric traveling state in the embodiment of the invention.

The hybrid vehicle is able to suppress consumption of fuel and improve fuel economy by using the electric power of the electrical storage device. On the other hand, the electric power of the electrical storage device is used to perform motoring for starting the engine 1 or drive the auxiliaries, such as an air conditioner or a battery temperature adjustment device, for example. At the request of controllability or durability, for example, the amount of charge and the amount of discharge of the electrical storage device are limited. Therefore, the electrical storage device is used to achieve both of these requests and limitations. For example, when the engine 1 is started in the electric traveling state, control described as follows is executed.

Figure 1:
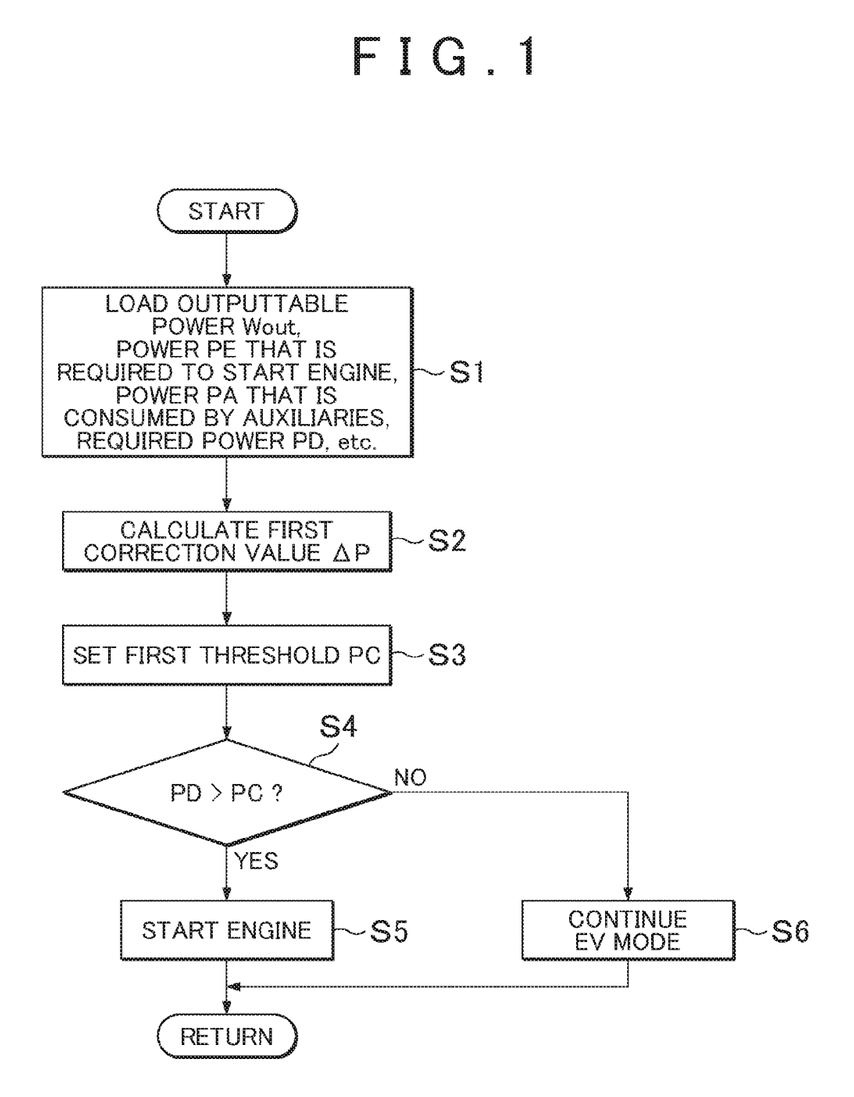
FIG. 1 is a flowchart for illustrating an example of control that is executed in an embodiment of the invention.

FIG. 1 is a flowchart for illustrating an example of engine startup control that is executed by a control apparatus in an embodiment of the invention. A routine is executed at a time when the traveling mode of the hybrid vehicle is the EV mode in which the hybrid vehicle travels with the use of the first motor generator 2 and the second motor generator 15 as driving force sources. Initially, various pieces of data are loaded (step S1). Data that are loaded here include, for example, a power PE that is required to start the engine 1, a power Wout that is outputtable from the electrical storage device, a power PA that is consumed or required by the auxiliaries, and a required power PD based on driver's acceleration and deceleration operation.

Figure 2:
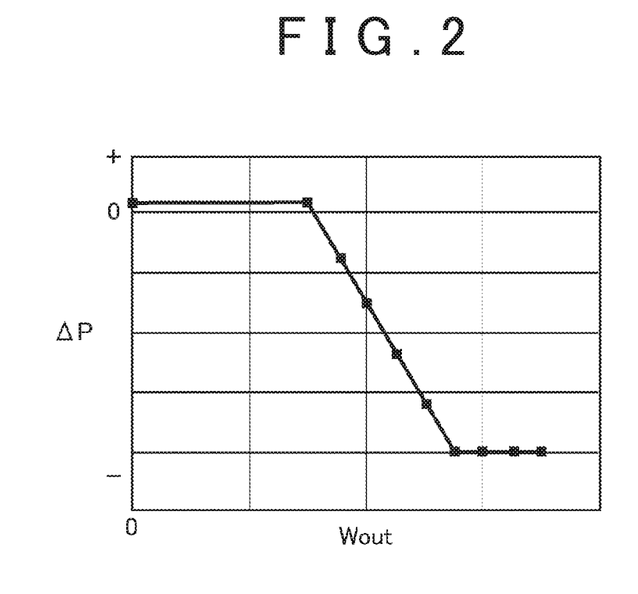
FIG. 2 is a view that schematically shows an example of a map that determines a first correction value.

Subsequently, a correction value ΔP is obtained (step S2). The correction value is a value for reflecting the power (hereinafter, referred to as outputtable power) Wout that is outputtable from the electrical storage device in a threshold for determining whether to start the engine 1, and may be prepared in form of a map, for example, by design on the basis of an experiment. An example of the map is schematically shown in FIG. 2. The example shown in FIG. 2 is an example in which the abscissa axis represents the outputtable power Wout and the ordinate axis represents a correction value ΔP. The correction value ΔP is set to be a smaller value as a subtraction value or a larger value as an addition value as the outputtable power Wout increases.

In the embodiment described here, because the threshold is obtained through a subtraction formula, the correction value ΔP becomes a smaller value (the absolute value of the negative value becomes a larger value) as compared to when the outputtable power Wout is large than when the outputtable power Wout is small in the example shown in FIG. 2. That is, the correction value takes a value for increasing the threshold or a value for reducing the threshold depending on the outputtable power Wout. A correction value corresponding to each outputtable power Wout just needs to be set as needed so as to increase the threshold and, as a result, increase the traveling region, frequency or opportunity that the EV mode is allowed to be set. Therefore, as shown in FIG. 2, the correction value may be set so as to become a positive constant value at or below a predetermined small outputtable power, and become a negative constant value at or above a predetermined large outputtable power. Alternatively, the correction value may be configured to become a different value for each outputtable power Wout or become a value that is proportional to the outputtable power Wout.

Subsequently, a threshold PC is set (step S3). The threshold PC is a threshold for determining whether to start the engine 1 while the hybrid vehicle is traveling in EV mode, and is obtained by subtracting the power PE that is required to start the engine 1, the power PA that is consumed or required by the auxiliaries, and the correction value ΔP from the outputtable power Wout.

$$PC = Wout - PE - PA - \Delta P$$

As described above, the correction value ΔP becomes a negative value when the outputtable power Wout is large, so the correction value ΔP is added to the outputtable power Wout for the purpose of calculating the threshold PC.

Figure 3:
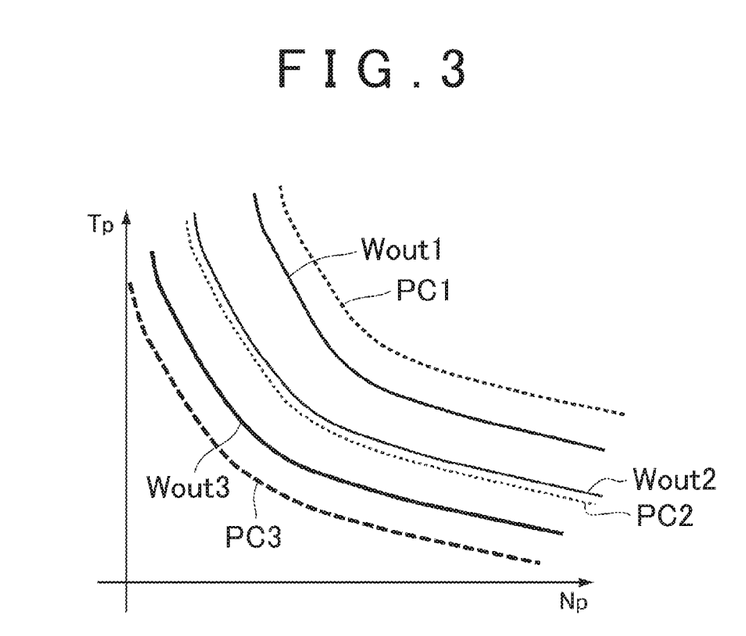
FIG. 3 is a graph in which each first threshold and a corresponding one of constant power lines are drawn side by side.

An example of the thus obtained threshold PC is schematically shown in FIG. 3. In FIG. 3, the abscissa axis represents a rotation speed Np of an output member, such as a propeller shaft (not shown), the ordinate axis represents a torque Tp of the output member, and outputtable powers Wout1, Wout2 (<Wout1), Wout3 (<Wout2) and corresponding thresholds PC1, PC2, PC3 are illustrated. When the outputtable power Wout is large (Wout1), the correction value ΔP reduces and takes a negative value and the absolute value of the correction value ΔP increases, so the threshold PC1 becomes a large value and is indicated by the line drawn on the higher power side than the constant power line indicating the outputtable power Wout1. When the outputtable power Wout is small (Wout3), the correction value ΔP becomes a large value and takes a negative value; however, the absolute value of the correction value ΔP reduces or takes a positive value, so the threshold PC3 becomes a small value and is indicated by the line drawn on the lower power side significantly spaced apart from the constant power line indicating the outputtable power Wout3. When the outputtable power Wout is intermediate (Wout2), the correction value ΔP becomes an intermediate value, so the threshold PC2 is indicated by the line drawn close to the constant power line indicating the outputtable power Wout2 or the line drawn overlappingly. That is, a deviation between the outputtable power Wout and the threshold PC in the case where the outputtable power Wout is intermediate is set so as to be smaller than the deviation in the case where the outputtable power Wout is large or the outputtable power Wout is small.

It is determined whether the required power PD based on a driver's acceleration and deceleration operation exceeds the threshold PC set in this way (step S4). The required power PD may be, for example, obtained by obtaining a required driving force on the basis of a vehicle speed V and an accelerator operation amount ACC and then obtained on the basis of the required driving force and the vehicle speed V, and the calculation may be a generally known computation. When affirmative determination is made in step S4 because of the fact that the required power PD exceeds the threshold PC, the engine 1 is started (step S5), and then the process returns. Specifically, torque in the positive rotation direction is generated by the first motor generator 2, and the torque of the second motor generator 15 in the positive rotation direction is increased such that the generated torque cancels the torque that acts on the ring gear 7 in the negative rotation direction.

As is apparent from the nomograph of FIG. 7 or FIG. 8, the rotation speed of the sun gear 6 in the negative rotation direction is reduced by the use of the first motor generator 2 while the rotation speed of the ring gear 7 is kept by increasing the torque of the second motor generator 15. Alternatively, when the rotation speed is increased in the positive rotation direction, the rotation speed of the engine 1 coupled to the carrier 4 is raised, and motoring (cranking) of the engine 1 is performed. In this case, as well as in EV mode, large current flows through each of the motor generators 2, 15 such that each of the motor generators 2, 15 functions as a motor, so engine startup control shown in FIG. 1 is executed on the precondition that no thermal constraints or no temperature constraints are imposed on the motor generators 2, 15 or the power supply unit 18, for example. When negative determination is made in step S4 because of the fact that the required power PD is smaller than or equal to the threshold PC, the EV mode is continued (step S6), and then the process returns.

Therefore, with the above-described control shown in FIG. 1, the threshold PC for starting the engine 1 in EV mode is set to a larger value as the outputtable power Wout increases. Therefore, for example, the EV mode is continued until the accelerator operation amount ACC increases and the required power PD becomes a large value, and the electric power of the electrical storage device is used for propelling the hybrid vehicle. That is, the percentage or frequency at which stored electric power is used for propelling the hybrid vehicle increases, so electric power is effectively utilized. Because power (electric power) for driving each of the motor generators 2, 15 is sufficient, it is possible to smoothly start the engine 1 by quickly increasing the rotation speed of the engine 1 and suppressing insufficient driving torque.

In contrast, when the outputtable power Wout is low, the threshold PC becomes a small value, so the duration or opportunity of the EV mode reduces. However, the engine 1 is subjected to motoring in a state where the outputtable power is left, so it is possible to smoothly start the engine 1 without causing insufficient driving force or shock, for example. When the outputtable power Wout is intermediate, the engine 1 is not started in a stage where the required power PD is small, so it is possible to increase the duration or opportunity of the EV mode, and the EV mode is not continued until the required power particularly increases. Therefore, it is possible to start the engine 1 without leading to a situation, such as insufficient driving force.

Next, another example of control in an embodiment of the invention will be described. When the required power increases in the EV traveling state, the engine 1 is started in order to satisfy a driving request. In this case, when the engine 1 is started and driving force is generated, the driving request is satisfied. Therefore, when there is a delay in startup of the engine 1, insufficient driving force and so-called feeling of slowness accordingly may arise. When the threshold for determining whether to start the engine is appropriate, power for motoring and power for cancelling reaction resulting from motoring are sufficiently ensured, so a delay of a startup of the engine 1 does not particularly occur; however, in a special situation, such as the situation that the temperature of the engine 1 is low, a delay in engine startup may occur. In an embodiment of the invention, the following control is executed.

Figure 4:
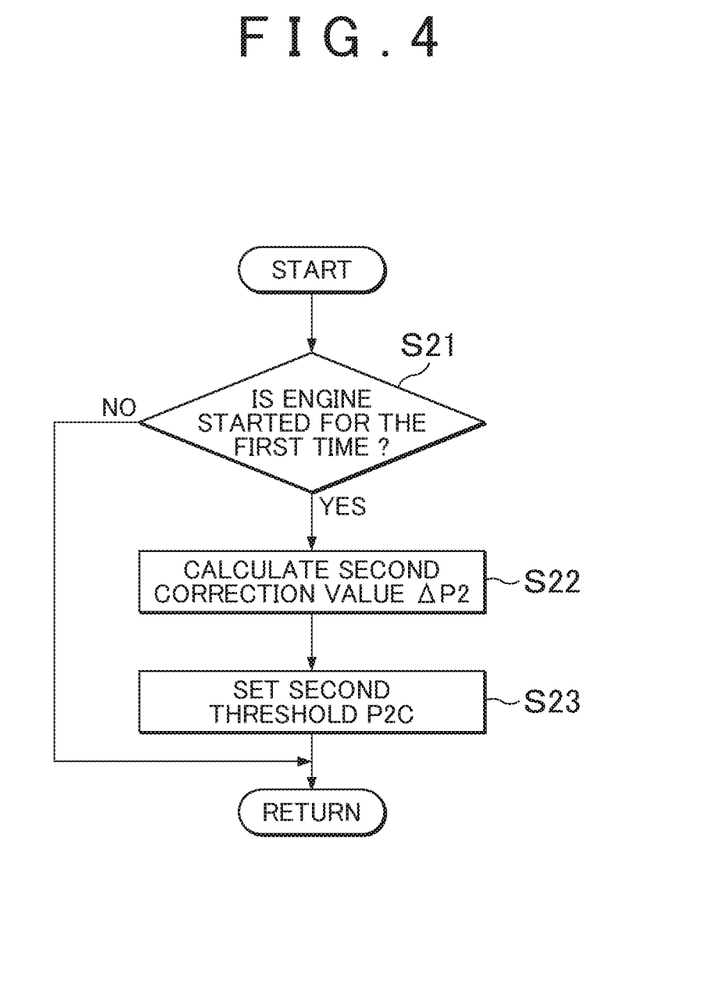
FIG. 4 is a flowchart for illustrating another control example that is executed in an embodiment of the invention.

FIG. 4 is a flowchart for illustrating a control example. This flowchart may be configured as a sub-routine that is simultaneously executed in step S2 shown in FIG. 1. Initially, it is determined whether a startup of the engine 1 is the first time (step S21). The "first time" means that whether to start the engine is determined for the first time after a state (ready-on state) where electric power is allowed to be supplied from the electrical storage device to each of the motor generators 2, 15 is established. When negative determination is made in step S21, the process returns without any particular control. In contrast, when affirmative determination is made in step S21, a second correction value $\Delta P2$ based on the temperature of the engine 1 is obtained (step S22). The second correction value $\Delta P2$ is a correction value for starting the engine 1 in a state where there is an allowance in the power Wout that is outputtable from the electrical storage device when it is estimated that it takes time to start the engine 1 because the temperature of the engine 1 is low, and is a value for correcting the threshold described with reference to FIG. 1 to a smaller value. Specifically, the second correction value $\Delta P2$ is obtained on the basis of the prepared map shown in FIG. 5.

Figure 5:
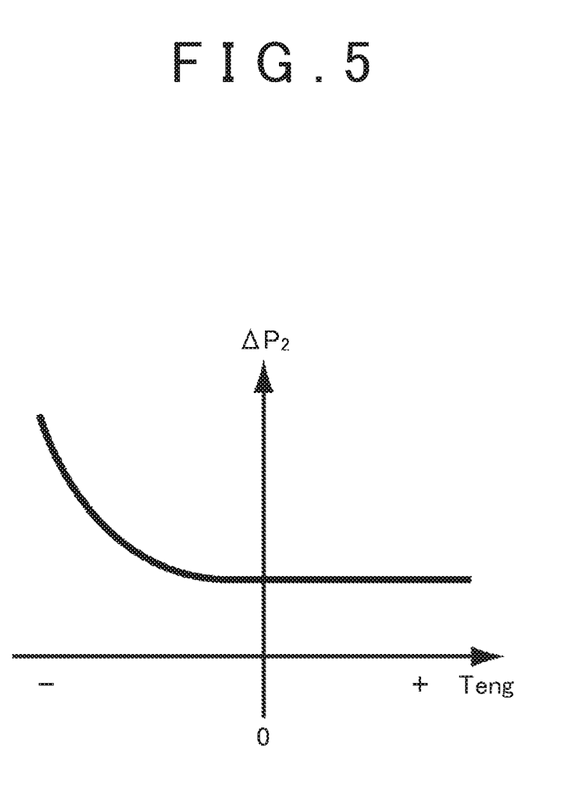
FIG. 5 is a view that schematically shows an example of a map that determines a second correction value.

The map shown in FIG. 5 is a map in which the second correction value $\Delta P2$ is determined for each temperature Teng of the engine 1. The map is configured such that the second correction value $\Delta P2$ takes a predetermined constant value when the engine temperature Teng is higher than or equal to a predetermined temperature lower than 0° C. and takes a larger value as the engine temperature Teng decreases when the engine temperature Teng is lower than the predetermined temperature. This map is a map in which a correction value for avoiding a delay of a startup of the engine 1 is determined, and a delay of a startup of the engine 1 is experienced by a driver, so the map or correction value $\Delta P2$ is determined in advance by an experiment or simulation, for example. The temperature Teng of the engine 1 may be replaced with engine coolant temperature.

Subsequently, a second threshold P2C is obtained by using a second correction value $\Delta P2$ (step S23), and the process returns. The second threshold P2C is a threshold obtained such that the first threshold PC, which is obtained in consideration of the outputtable power Wout, is corrected in consideration of the temperature Teng of the engine 1. The second threshold P2C is specifically obtained by subtracting the second correction value $\Delta P2$ from the first threshold PC.

$$P2C = PC - \Delta P2$$

Therefore, in step S3 shown in FIG. 1, a computation expressed by PC=Wout−PE−PA−$\Delta P$−$\Delta P2$ may be performed, the second correction value $\Delta P2$ may be loaded from the map shown in FIG. 5 when the engine 1 is started for the first time; otherwise, the second correction value $\Delta P2$ may be set to zero ($\Delta P2=0$).

Therefore, when the temperature of the engine 1 is low, the second correction value $\Delta P2$ becomes a larger value, so the threshold P2C for determining whether to start the engine 1 becomes a smaller value. Therefore, the engine 1 is started in a state where the required power is small. That is, because the engine 1 is started in a state where there is an allowance for power that is required to start the engine 1 even when the outputtable power Wout is small, it is possible to quickly start the engine 1 and avoid or suppress a feeling of strangeness, such as so-called a feeling of slowness.

Embodiments of the invention are not limited to the above-described exemplary embodiments. An engagement mechanism for stopping reverse rotation of the engine 1 may be a multiple disc clutch or a dog clutch instead of a one-way clutch. The power split mechanism may be a mechanism formed of rollers other than a mechanism formed of gears. Embodiments of the invention may be modified as needed within the scope of the configuration described in the claims.

What is claimed is:

1. A control apparatus for a hybrid vehicle, the hybrid vehicle including
a power split mechanism,
an engine,
a first motor coupled to the engine via the power split mechanism,
a second motor coupled to an output element of the power split mechanism,
an electrical storage device connected to the first motor and the second motor,
an engagement mechanism configured to prevent reverse rotation of the engine, and
auxiliaries, the hybrid vehicle being configured to travel in electric traveling mode by using driving force that is output from the first motor and the second motor in a state where reverse rotation of the engine is prevented by the engagement mechanism, the control apparatus comprising:
a controller configured to
  i) start the engine in a state where the hybrid vehicle is traveling in the electric traveling mode,
  ii) obtain a first power, a second power, a third power, and a fourth power, the first power being a power that is required to start the engine, the second power being a required power based on acceleration and deceleration operation performed by a driver of the hybrid vehicle, the third power being a power that is consumed by the auxiliaries, and the fourth power being a power that is outputtable from the electrical storage device,
  iii) obtain a first correction value such that the first correction value becomes a smaller value as the fourth power increases, the first correction value becomes a larger value as the fourth power decreases, and the first correction value is a positive value or a negative value,
  iv) obtain a first threshold by subtracting the first power, the third power and the first correction value from the fourth power such that the first threshold becomes a larger value as the fourth power increases, and
  v) when the second power exceeds the first threshold while the hybrid vehicle is traveling in the electric traveling mode, start the engine.

2. The control apparatus according to claim 1, wherein the controller is configured to
  vi) obtain a second correction value such that the second correction value becomes a larger value as a temperature of the engine decreases,
  vii) obtain a second threshold by reducing the first threshold in response to the second correction value, and
  viii) when the engine is started for the first time after switching into a state where electric power is allowed to be supplied from the electrical storage device to the first motor and the second motor, start the engine when the second power exceeds the second threshold.

* * * * *